United States Patent
Ajtai

(10) Patent No.: US 8,462,940 B2
(45) Date of Patent: Jun. 11, 2013

(54) PUBLIC KEY CRYPTOSYSTEM AND ASSOCIATED METHOD UTILIZING A HARD LATTICE WITH O(N LOG N) RANDOM BITS FOR SECURITY

(75) Inventor: Miklos Ajtai, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 1678 days.

(21) Appl. No.: 11/330,940

(22) Filed: Jan. 11, 2006

(65) Prior Publication Data

US 2007/0189515 A1 Aug. 16, 2007

(51) Int. Cl.
*H04L 9/30* (2006.01)

(52) U.S. Cl.
USPC .......................................................... 380/30

(58) Field of Classification Search
USPC .......................................... 380/30; 726/2, 26
See application file for complete search history.

(56) References Cited

U.S. PATENT DOCUMENTS

| 5,737,425 A | 4/1998 | Ajtai |
| 6,298,137 B1 | 10/2001 | Hoffstein et al. |
| 2003/0120929 A1 | 6/2003 | Hoffstein et al. |

OTHER PUBLICATIONS

Hoffstein et al. "NTRU: A Public Key Cryptosystem." pp. 1-20. Published Aug. 1999. Accessed Apr. 6, 2009.*
Oded Regev, New Lattice-Baswed Cryptographic Constructions, Nov. 2004, Journal of the ACM.*
Ajtai et al., "A Public-Key Cryptosystem with Worst-Case/Average-Case Equivalence", proceedings of STOC 1997.
Hoffstein et al., "NTRU: A ring-based public key cryptosystem", proceedings of ANTS III, 267-288, 1998.
Goldreich et al., "Public-Key Cryptosystems from Lattice Problems", proceedings of CRYPTO'97, 112-131, Nov. 12, 1996.

* cited by examiner

*Primary Examiner* — Ellen Tran
(74) *Attorney, Agent, or Firm* — Shimokaji & Assoc., PC

(57) ABSTRACT

A public key cryptosystem utilizes a hard lattice with O(n log n) random bits for security. The system comprises a public-key cryptosystem whose hardness assumption is a clearly stated mathematical problem with a long history and comprises a short key, reaching a balance between the favorable properties of the hardness assumption and the key size. This balance has not been achieved by previously known public-key cryptosystems. The improved efficiency of the present system is achieved by reducing the size of the public key from $O(n^2 \log n)$ to $O(n \log n)$. The improved security of the system is achieved by reducing the security to the hardness of a clearly stated computational problem, the dipohantine approximation problem of Dirichlet.

2 Claims, 3 Drawing Sheets

PUBLIC KEY CRYPTOSYSTEM AND ASSOCIATED METHOD UTILIZING A HARD LATTICE WITH O(N LOG N) RANDOM BITS FOR SECURITY

The present patent application has been prepared based on two papers authored by the inventor, both titled "Representing Hard Lattices with O(n log n) Bits." These two papers may comprise additional subject matter, such as proofs of the theorems or lemmas stated herein without proof, as well as restatements of much of the same subject matter as given in the specification that follows. These papers are incorporated herein by reference in their entirety, and are designated as Appendices A and B to this patent application.

FIELD OF THE INVENTION

This invention generally relates to the field of cryptography and cryptosystems. More particularly, the invention relates to a system and method for providing enhanced cryptographic security by basing a public/private key cryptosystem on a class of problems whose instances are provably as difficult to solve as a diophantine approximation problem.

BACKGROUND OF THE INVENTION

A cryptosystem is usable, for secure communication between users, only if the users may expect that a third party, called a "cryptanalyst," is not able to break the cryptosystem. A definition of the term, "to break" the cryptosystem, comprises several different activities that the users seek to prevent the cryptanalyst from performing. Breaking a cryptosystem comprises any of the following activities: reading messages sent between the users, producing a fake identification of one user, which appears authentic to the other user, by conforming with certain authenticity criteria that is inaccessible to anyone other than the users, forging a digital signature for a message to falsely indicate that the message was sent by the apparent signer, etc.

If a cryptosystem cannot be broken, then the cryptosystem is said to be "secure." However, making a secure cryptosystem is easier said than done: at the present time, there is no mathematical proof of the safety of any of the known and used cryptosystems if the key is significantly shorter than the message. (There is a well-known one-time pad system that is provably secure. However, because it uses a key that is as long as the message, it is frequently impractical to use.)

There are, however, relative mathematical proofs of the security of certain cryptosystems, in the sense that the security of the cryptosystem follows from an unproven but simple assumption, the assumption being widely believed to be true.

One cryptosystem is considered to be "more secure" than another, if, in the scientific community, there is a stronger belief that the underlying assumption of the first cryptosystem is true. The belief that one cryptosystem is more secure than another is usually based on an extensive body of related research. Some such bodies of research have originated with work performed hundreds of years ago. As a consequence, the long period of time during which the underlying assumption has been studied lends credence to the belief that the cryptosystem based on the underlying assumption is in fact secure.

Most of the cryptosystems used today employ a certain class of problems. That is, use of a previously known cryptosystem is based on knowledge of the solution to a problem. As a corollary, finding the (unknown) solution to the problem is a prerequisite for a cryptanalyst breaking the encryption.

A particular cryptosystem, or a message encrypted using a particular cryptosystem, is based on an individual case of the underlying problem. The general form of the cryptosystem is the same, regardless of the particular case of the problem used. However, the security of the encrypted message is determined, not only on the problem in general, but also on the particular case of the problem that was used in this instance to encrypt this message. It is understood that, if a cryptosystem based on a particular problem is used repeatedly, different cases of the problem are used for different messages.

The security of these cryptosystems is based on an assumption (not necessarily proven) that the problem upon which the encryption algorithm is based is difficult to solve in the average case. That is, while some cases are easier than others, and while there is not necessarily a finite, or ascertainable, total number of possible cases, it is at least empirically evident that, to a high probability, a randomly chosen case is sufficiently difficult to be useful for purposes, such as cryptography, that require that the case be difficult.

For instance, the commonly-used Rivest-Shamir-Adleman (RSA) cryptosystem given in Rivest et al., U.S. Pat. No., 4,405,829, "Cryptographic Communications System and Method," employs a number that is a product of two large prime numbers. This cryptosystem is considered to be secure to the degree that it is difficult to factor a large, randomly chosen number, particularly a product of two large prime numbers.

The RSA cryptosystem encrypts a plaintext message M into a cyphertext C. The plaintext message M is initially given in terms of a number having a value between 1 and a large number n, n being the product of two large prime numbers p and q. M is encrypted to produce C as follows: M is divided into blocks, as appropriate. M, or each block thereof, is transformed, i.e., encrypted, to the ciphertext C as described by the expression $$C = M^e (\mathrm{mod}\ n)$$

where e is a number relatively prime to the product (p−1)(q−1). The encrypting key (public key) comprises the numbers e and n.

To decrypt the ciphertext C, a decrypted message M′ (which is expected to be identical to M) is obtained from the decryptor:

$$M' = C^d (\mathrm{mod}\ n)$$

The decrypting key comprises the numbers d and n. The number d, known only to the holder of the decrypting key, is a multiplicative inverse of $$e (\mathrm{mod}\ 1\ \mathrm{cm}((p-1)(q-1)))$$

Thus, $$ed = 1 (\mathrm{mod}\ 1\ \mathrm{cm}((p-1)(q-1)))$$

A cryptanalyst is required to factor n to obtain d. Thus, the processes of encryption and decryption, as practiced in the RSA cryptosystem, make direct use of the factoring problem.

The security of the RSA cryptosystem and that of other previously known cryptosystems are based on the average-case difficulty of their underlying classes of problems. The difficulty of the RSA cryptosystem is limited by the fact that the ease of factoring numbers varies drastically. There are certain large numbers that, despite their size, are very easy to factor. For example, any power of 10, however great, is easy to factor. On the other hand, the product of two large prime numbers is more difficult to factor.

Therefore, the factoring problem used in the RSA cryptosystem is an example of a problem that is difficult in the worst case, but not difficult, or much less difficult, in the average case.

Moreover, since the development of the fundamental concept of public key cryptography, there have not been a large number of successful public key systems other than the popular and successful RSA cryptosystem. Therefore, other public key cryptosystems, even if they do not address the average-case/worst-case question, would be welcome additions to the field.

Presently there is no public key cryptosystem whose security is proved without any unproven assumption. For example, the security of RSA depends on the assumption that there is no efficient algorithm that finds the prime factors of a large integer m where m is generated as the product of two random primes satisfying certain conditions.

In other words, the security of the cryptosystem is reduced to the hardness of a computational problem; this computational problem is referenced as the hardness assumption of the corresponding cryptosystem. Since none of the hardness assumptions of the public key cryptosystems have been proved, many different public key cryptosystems with different hardness assumptions are useful. If one of the hardness assumptions is discovered to be false such that the credibility of the related cryptosystem is lost, another system may replace the failed cryptosystem.

A hardness assumption has an advantage if it comprises a simple, clearly stated mathematical statement that has been studied for a long time (preferably prior to the invention of the corresponding cryptosystem). Such a long history makes it more likely that the computational question described in the hardness assumption is truly difficult. Most of the known public key cryptosystems do not meet this requirement. For example, in the case of the RSA cryptosystem, the worst-case problem of factoring an integer is a clearly stated problem with a long history. However, the security of the RSA system is not reduced to this problem.

The security of the RSA cryptosystem depends on the hardness of an average case problem where the integer m to be factored is produced as the product of two random prime integers p and q. The distributions of p and q have a complicated description since certain pairs of primes p, q, for which factoring is easy are required to be excluded. The list of these exceptional cases is still growing. In this form, the problem is not a simply stated problem and has not been studied independently of the cryptosystem. This limitation of the RSA cryptosystem motivated the formulation of other public key systems, in particular public key cryptosystems, whose hardness assumptions are computational problems about lattices.

One previously known cryptosystem based on lattices has a clearly stated hardness assumption with a long history. Although this previously known cryptosystem has proven to be useful, it would be desirable to present additional improvements. This previously known cryptosystem (and other related cryptosystems) comprises very large key-sizes, making practical implementation difficult. There are other previously known cryptosystems related to lattices in which the keys are smaller. However, in these cryptosystems the hardness assumptions are not clearly stated mathematical problems with long histories.

Previously known cryptosystems are based on lattices and associated improvements comprise variants. All of these previously known cryptosystems (with a clearly stated hardness assumption with a long history) comprise key sizes of at least $O(n^2 \log n)$. Another previously known lattice-based cryptosystem (not a public key system) comprises key sizes larger than $O(n^2 \log n)$.

Several other previously known lattice-based public key cryptosystems comprise shorter keys, with size of $O(n \log n)$. However, the hardness assumptions of these previously known cryptosystems have no long history. Rather, the hardness assumptions were formulated together with the cryptosystem. A disadvantage of cryptosystems whose hardness assumption does not have a long history is that there is no evidence that the computational problem described in such a hardness assumption is truly difficult.

Thus, there is a need for a cryptosystem comprising shorter keys based on a hardness assumption that has been studied for a sufficiently long time. What is therefore needed is a public key cryptosystem, a computer program product, and an associated method utilizing a hard lattice with $O(n \log n)$ random bits for security. The need for such a solution has heretofore remained unsatisfied.

SUMMARY OF THE INVENTION

The present invention satisfies this need, and presents a public key cryptosystem, a computer program product, and an associated method (collectively referred to herein as "the system" or "the present system") utilizing a hard lattice with $O(n \log n)$ random bits for security. A lattice is hard if the computational problem of finding a non zero short vector in the lattice has no efficient solution. The present system comprises a public-key cryptosystem whose hardness assumption is a clearly stated mathematical problem with a long history and comprises a short key.

The present system reaches a balance between the favorable properties of the hardness assumption and the key size. This balance is desirable for practical implementations and has not been achieved by any other previously known public-key cryptosystems. The hardness assumption of the present system is based on the dipohantine approximation problem of Dirichlet. The dipohantine approximation problem has been well known. During this period of time, the best mathematicians without success have attacked the dipohantine problem. Therefore, the hardness assumption of the present system is shown historically to be truly difficult.

The present system is more efficient and more secure than previously known lattice-based cryptosystems. Improved efficiency of the present system is achieved by reducing the size of the public key from $O(n^2 \log n)$ to $O(n \log n)$. Improved security of the present system is achieved by reducing the security to the hardness of a clearly stated and well-known computational problem, the dipohantine approximation problem of Dirichlet.

The present system can be easily modified to use other methods of information processing, such as, for example, error correcting codes. The foregoing and other features and aspects of the present invention are realized by a system and method for using a public key cryptosystem having a hard lattice represented by $O(n \log n)$ random bits as the public key. In a preferred embodiment, the method includes selecting an integer d at random, with uniform distribution from a set of all integers in an interval $$\left[\frac{1}{2}(n-1)^{\xi(n-1)}, (n-1)^{\xi(n-1)}\right],$$

where n is an integer that is greater than or equal to 3 and $\xi$ is a real number that is greater than 0.

The method further selects a point $q=<q_1, \ldots, q_{n-1}>\in R^n$ with uniform distribution from a set $I_{n-1}((n-1)^{-\beta})\cap dQ$, where $\beta$ is a real number that is greater than 0, where $k=\lfloor(n-1)^{\xi(n-1)-1}\rfloor$ and $Q\in part_{n-1}(k)$. The selected quantities q and d determine a hard lattice L. A short vector u is also selected from the hard lattice L, while the lattice is constructed. Short vector u is the private key, and hard lattice L is the public key, represented by a sequence $t=<t_0, \ldots, t_{n-1}>$ of integers whose binary representations contain altogether at most O(n log n) bits. The terms in this paragraph will be defined later in more detail.

A sequence $t=<t_0, \ldots, t_{n-1}>$ is further selected, where t comprises a public key, wherein the private key and the public key are used to encrypt and decrypt electronic files. The cryptosystem utilizes a hard lattice with O(n log n), with the lattice L having a basis that includes a sequence of vectors $e_1, \ldots, e_{n-1}, v$, where:

$$v = (n-1)^{\xi(n-1)-\beta}e_n + \sum_{i=1}^{n-1} fr\left(\frac{q_i}{d}, kn^\gamma\right)e_i.$$

The terms in this paragraph will be defined later in more detail.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
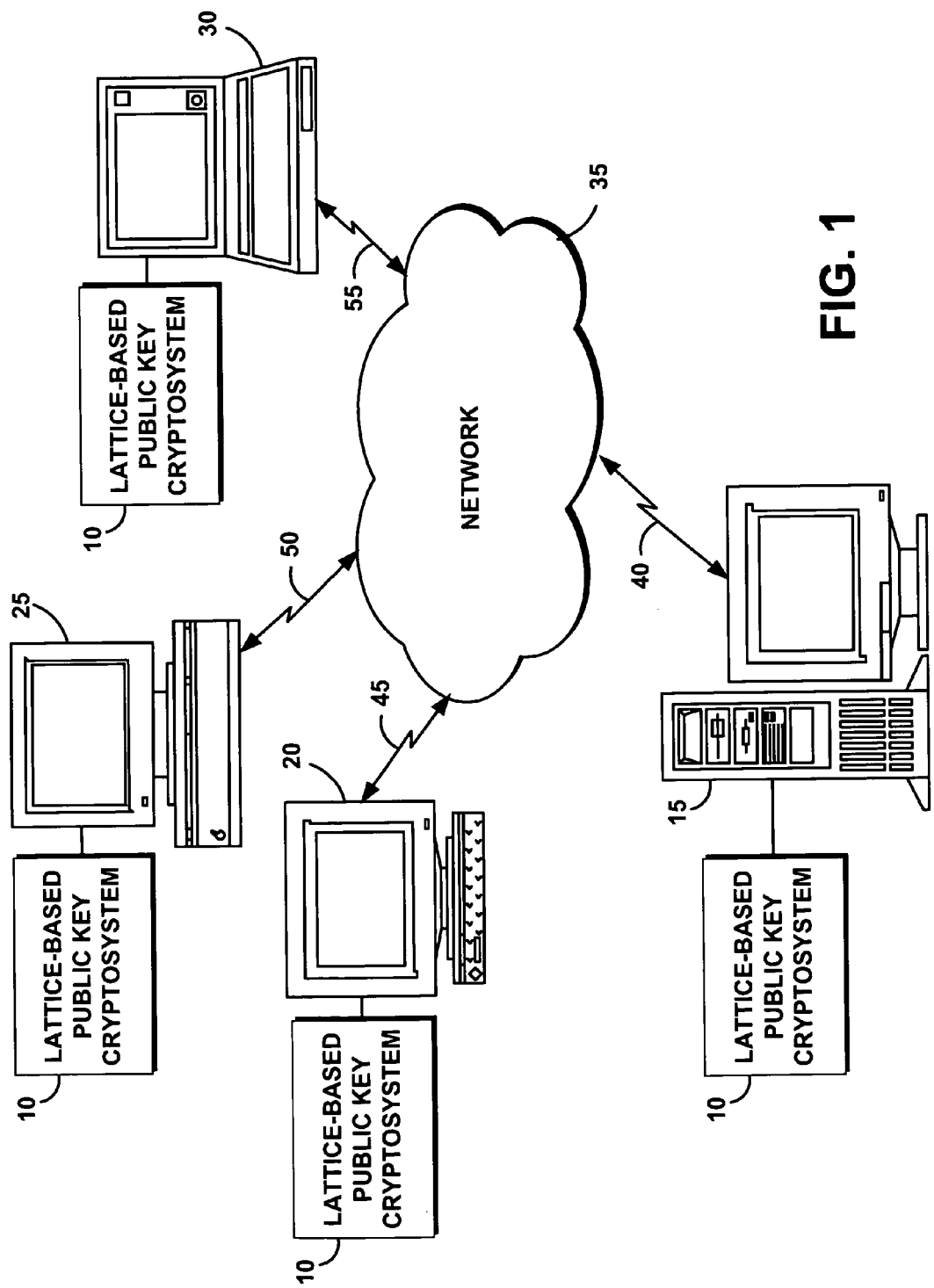
FIG. 1 is a schematic illustration of an exemplary operating environment in which a lattice-based public key cryptosystem of the present invention can be used.

FIG. 1 portrays an exemplary overall environment in which a public key cryptosystem, a computer program product, and an associated method (the "lattice-based pubic key cryptosystem 10" or the "system 10") utilizing a hard lattice with O(n log n) random bits for security according to the present invention may be used. System 10 comprises a software programming code or a computer program product that is typically embedded within, or installed on computers that are engaged in secure communication such as server 15 and computers 20, 25, 30. Alternatively, system 10 can be saved on a suitable storage medium such as a diskette, a CD, a hard drive, or like devices.

Users, such as remote Internet users, are represented by a variety of computers such as server 15 and computers 20, 25, 30, and can access the each other through a network 35. Server 15 is connected to network 35 via a communications link 40 such as a telephone, cable, or satellite link. Computers 20, 25, 30, can be connected to network 35 via communications links 45, 50, 55, respectively. While system 10 is described in terms of network 35, computers 20, 25, 30 may also access each other and server 15 locally rather than remotely.

System 10 implemented at server 15 and computers 20, 25, 30 comprises a set of random bits given by the binary representations of the integers in the sequence b, $b=<b_1, \ldots, b_{n-1}>$ for which $I\leq b_i\leq \lfloor(n-1)^{\xi(n-1)-1}\rfloor=k$, described as follows. The random bits are distributed with the software of system 10 and, in one embodiment, are randomized once. The random bits are used by server 15 and computers 20, 25, 30 to generate a public and private key used for encryption and decryption of transmissions between server 15 and computers 20, 25, 30.

System 10 is based on a lattice defined as follows.
Definition 1: R denotes the set of real numbers, Z denotes the set of integers, and Q denotes the set of rationals.

$[[\alpha]]$ denotes distance of the real number $\alpha$ from the closest integer; i.e., $[[\alpha]]$ is the smallest nonnegative real number such that there is an integer k with $|k-\alpha|=[[\alpha]]$.

Assume that $\alpha$ is a real number and g is a positive integer. Let j be a unique integer such that $$\frac{j}{g} \leq \alpha < \frac{j+1}{g};$$

the following notation will be used:

$$fr(\alpha, g) = \frac{j}{g}.$$

If $a_1, \ldots, a_n$ are linearly independent vectors in $R^n$ then the set of their linear combinations with integer coefficients is called a lattice; $a_1, \ldots, a_n$ is a basis of the lattice. A lattice may have several different bases. The volume of the parallelepiped defined by the basis vectors is the determinant of the lattice, or equivalently the determinant of the lattice is the absolute value of the determinant of the matrix whose columns are the basis vectors. The dual $L^*$ of the lattice L is the set of all $x \in R^n$ so that xa $\in Z$ for all $a \in L$, where xa is the inner product of the vectors x and a. $L^*$ is a lattice in $R^n$.

The vector u is a shortest nonzero vector in the lattice L if $u\in L$, $u\neq 0$ and for all $v\in L$, $v\neq 0$ implies $\|v\|\geq\|u\|$. Assume $\alpha>1$. The vector u is an $\alpha$-unique shortest nonzero vector of L if it is a shortest nonzero vector in L, and for all $v\in L$, $\|v\|\leq\alpha\|u\|$ implies that v and u are parallel.

The unit vectors in $R^n$ are denoted by $e_1, \ldots, e_n$, that is, for all $i=1, \ldots, n$ the $i^{th}$ component of $e_i$ is one, all of the other components of $e_i$ are zeros.

If $a_1, \ldots, a_n$ is a basis of L then the unique basis $f_1, \ldots, f_n$ of $L^*$ so that for all $i=1, \ldots, n$, $a_if_i=1$ and for all $i, j \in \{1, \ldots, n\}$ with $i\neq j$, $a_if_j=0$, is called the dual of $a_1, \ldots, a_n$. If A is the matrix whose columns are $a_1, \ldots, a_n$ then the rows of $A^{-1}$ are the vectors $f_1, \ldots, f_n$.

If $a_1, \ldots, a_n$ are linearly independent vectors in $R^n$, then $P(a_1, \ldots, a_n)$ is the set of all vectors of the form $$\sum_{i=1}^n \alpha_i a_i$$

where $\alpha_i \in [0,1)$ for all $i=1, \ldots, n$.

System 10 is based on the assumption that it is possible to generate a lattice L (represented by a basis $g_1, \ldots, g_n$) together with an $n^c$-unique nonzero shortest vector u (where c>0 is a constant). The lattice is generated such that given only the basis $g_1, \ldots, g_n$, there is no efficient way to find the vector u. The basis $g_1, \ldots, g_n$ is the public key and the vector u is the private key, System 10 generates such a basis $g_1, \ldots, g_n$ and a vector u, in a way that the basis $g_1, \ldots, g_n$ can be represented by only O(n log n) bits.

A basis $b_1, \ldots, b_n$ of an n-dimensional lattice comprises n vectors; each of these vectors comprises n components. A basis represented by listing the components of the basis vectors requires at least $n^2$ bits. System 10 represents those generated basis vectors in a way that makes possible the reduction on the number of bits in the public keys to O(n log n). In comparison, previously known lattice-based cryptosystems that have security guarantee comparable to system 10 (that is, security of these previously known lattice-based cryptosystems is reduced to a clearly stated well-known computational problems) have key-sizes of at least $O(n^2 \log n)$.

System 10 achieves a small ratio between the number of bits in the encrypted text and the number of bits in the clear text; i.e., this ratio is only O(n log n). There are no known lattice based cryptosystems with a clearly stated hardness assumption with a long history, where this ratio is smaller than $O(n^2 \log n)$.

Compared to previously known lattice-based cryptosystems, system 10 achieves a reduction in the size of the key. System 10 also employs an improved perturbation of lattice points by normal distribution, and a simplified way of representing the encrypted text, as is well known in the field. This simplified representation comprises representing each point x in $R^n$ by an x' $\in P(a_1, \ldots, a_n)$ with the property x−x' $\in L^*$ where $a_1, \ldots, a_n$ is a basis of $L^*$, instead of taking x from a large cube.

The participants of system 10 share the following information.

An integer n that is the dimension of the lattices used by system 10 and constants $\beta>0$, $\xi>0$, and $\gamma>0$.

A random sequence of integers b that comprises no more than $O(n^2 \log n)$ bits and that is chosen according to a distribution that is described later.

A deterministic polynomial time algorithm B that, if b and a sequence of integers t are given as input, computes a basis B(b, t) of a lattice L(b, t).

A probabilistic polynomial time algorithm D.

The algorithm D, given b as an input, generates a random sequence of integers t and a nonzero vector u. The algorithm D determines the distribution of the random sequence of integers t such that the total number of bits in t is O(n log n). The vector u, with a probability exponentially close to 1, is an $n^c$-unique shortest nonzero vector of L(b, t) with $$(n-1)^{\frac{1}{2}-\beta-\varepsilon'} \leq \|u\| \leq 2(n-1)^{\frac{1}{2}-\beta}$$

where the probability is taken for the randomization of t only while b is considered as fixed. Moreover if the hardness assumption of system 10 holds, then there is no polynomial time probabilistic algorithm that finds a shortest nonzero vector in L(b, t) with polynomially large probability with respect to the combined randomization and the random steps of the algorithm D.

Knowledge of the sequence b, the algorithm B, and the algorithm D is required for all of the participants of system 10.

In one embodiment, the software implementing system 10 comprises the sequence b, the algorithm B, and the algorithm D.

To select public/private keys, a participant A of the system generates a random $t_A$ with a shortest nonzero vector u in L(b, $t_A$) using algorithm D. The public key is $t_A$. The private key is u.

To encrypt a 0, 1-bit x to be sent to participant A, system 10 determines $f_1, \ldots, f_n$, the dual of B(b, t). This is a basis of the lattice $L^*$. If x=0 then let y be a random point chosen from the parallelepiped P ($f_1, \ldots, f_n$) with uniform distribution. If x=1 then compute a random point z in $R^n$ with the normal distribution whose density function is $e^{-\pi\|x\|_2}$ for $x \in R^n$, and determine the unique element y of the parallelepiped P ($f_1, \ldots, f_n$) such that y−z $\in L^*$. Find a rational approximation $\bar{y}_i$ of each coefficient of the vector y=<$y_1, \ldots, y_n$> so that the denominator of $\bar{y}_i$ is n and $$|y_i - \bar{y}_i| < \frac{1}{n}.$$

The vector $\bar{y}$=<$\bar{y}_1, \ldots, \bar{y}_n$> is the encrypted message.

To decrypt a message, the participant A determines the inner product $\alpha = \bar{y}u$ and the closest integer $k_\alpha$, to $\alpha$. If $|\alpha - k_\alpha| \geq c (\log n)^{1/2}$ then x=0 otherwise x=1, where c is a large constant.

Description of an algorithm generating the random lattice for system 10 follows:

Definition 2: Suppose that $\lambda>0$ is a real number. $I_n(\lambda)$ denotes the set $$\{<x_1, \ldots, x_n> | [x_i] | \leq \lambda, i=1, \ldots, n\}$$

That is, $I_n(\lambda)$ is the union of all cubes centered around the integer points in $R^n$ and whose sides are parallel to the axis and are of length $2\lambda$.

If k is a positive integer then $part_n(k)$ denotes the partition of the unit cube $[0, 1)^n$ into subcubes of the form $$\prod_{i=1}^{n} \left[ \frac{b_i}{k}, \frac{b_i+1}{k} \right)$$

where $b_1, \ldots, b_n$ are integers with $0 \leq b_i < k$. The following notation is used:

$$\mathcal{Q}_k(b_1, \ldots, b_n) = \prod_{i=1}^{n} \left[ \frac{b_i}{k}, \frac{b_i+1}{k} \right)$$

Definition 3: System 10 uses a random way to pick a random lattice L, which serves as the public key for system 10. Together with the lattice L system 10 selects a short vector u that comprises the private key. As previously discussed, a pair of sequences of integers <b, t> represents the public key (i.e., lattice L).

Figure 2:
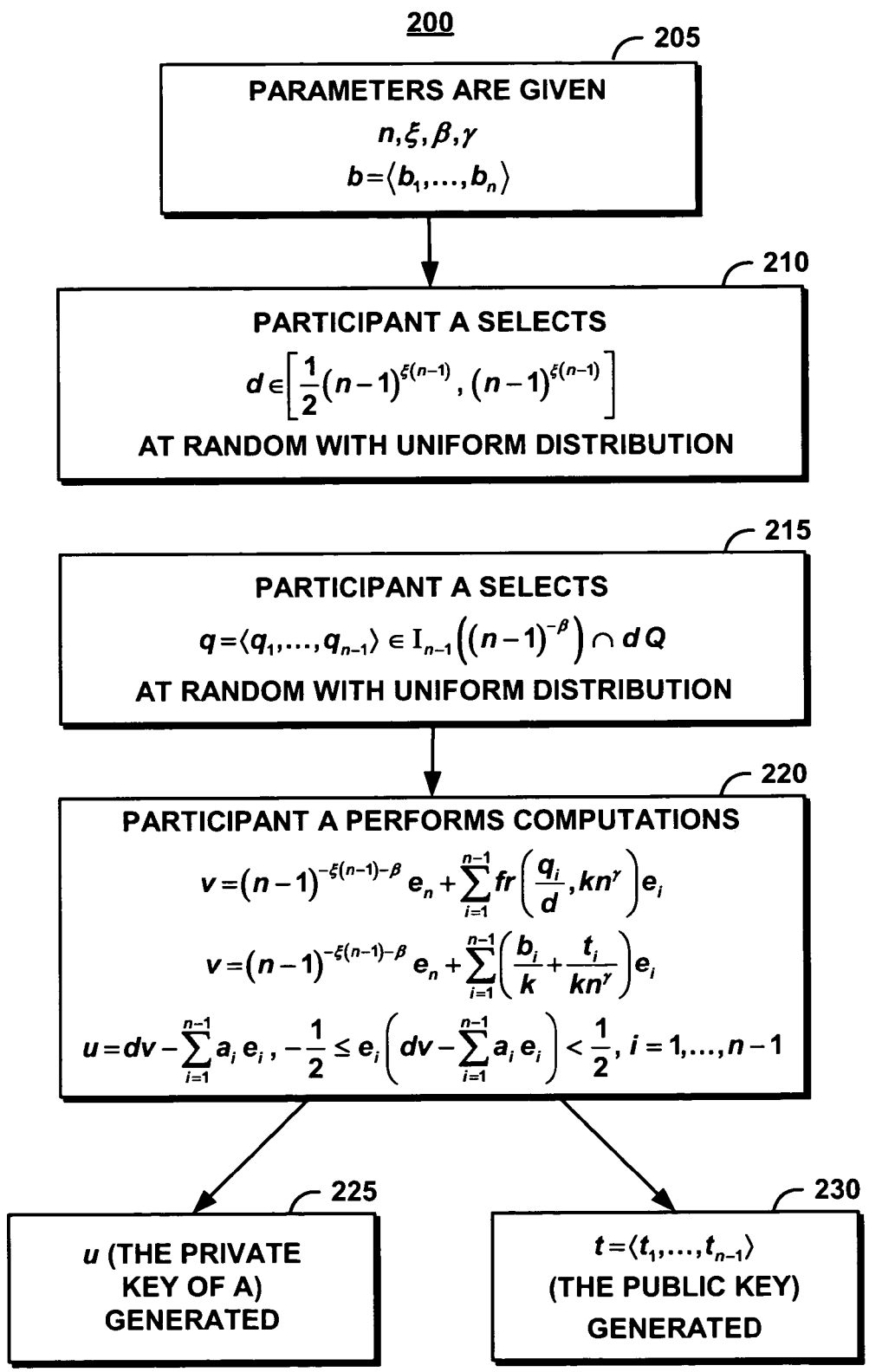
FIG. 2 is a process flow chart illustrating a method of operation of the lattice-based public key cryptosystem of FIG. 1, including the selections of a private key and a public key.

FIG. 2 illustrates a method 200 of system 10 in generating a private key and a public key. System 10 generates b and t as follows. The definition of b and t uses random real numbers that are chosen from an interval with uniform distribution. Naturally, a polynomial time algorithm can only choose a polynomial number of bits of such random real numbers and use this as an approximation for the subsequent computation.

If the number of bits used is sufficiently large, this modified distribution of b and t is exponentially close to the original distribution.

Initial parameters are given to system 10 (step 305). Suppose that n>3 is an integer, $\beta>0$, $\xi>0$, $\gamma>0$ are real numbers, $k=\lfloor (n-1)^{\xi(n-1)-1} \rfloor$, and $Q \in part_{n-1}(k)$. System 10 defines a random lattice L. System 10 selects an integer d at random (step 310), with uniform distribution from the set of all integers in the interval $$\left[\frac{1}{2}(n-1)^{\xi(n-1)}, (n-1)^{\xi(n-1)}\right].$$

System 10 selects a point $q=<q_1, \ldots, q_{n-1}> \in R^n$ with uniform distribution from the set $I_{n-1}((n-1)^{-\beta}) \cap dQ$ (step 315). L is the lattice whose basis is the sequence of vectors $e_1, \ldots, e_{n-1}$, v, where $$v = (n-1)^{\xi(n-1)-\beta} e_n + \sum_{i=1}^{n-1} fr\left(\frac{q_i}{d}, kn^\gamma\right) e_i$$

Together with the lattice L, system 10 selects a short vector u in the lattice L in the following way (step 320). System 10 selects a lattice L as described above. Assume that d is the integer and v is the basis vector chosen during the randomization of L. System 10 selects the integers $a_1, \ldots, a_{n-1}$ such that $$-\frac{1}{2} \leq e_i\left(dv - \sum_{i=1}^{n-1} a_i e_i\right) < \frac{1}{2} \text{ for } i=1, \ldots, n-1, u = dv - \sum_{i=1}^{n-1} a_i e_i$$

(step 325).

System 10 further comprises sequences $b=<b_0, \ldots, b_{n-1}>$ and $t=(t_0, \ldots, t_{n-1}>$. The sequence b has been previously defined. The following lemma illustrates how system 10 obtains the sequence t (step 330).

Lemma 1: Suppose that n>3 is an integer, $\beta>0$, $\xi>0$, $\gamma>0$ are real numbers, $k=\lfloor (n-1)^{\xi(n-1)-1} \rfloor$, $b_1, \ldots, b_{n-1} \in [0, k-1]$ are integers, $Q=Q_k(b_1, \ldots, b_{n-1})$, L is generated by $e_1, \ldots, e_{n-1}$, and $$v = (n-1)^{\xi(n-1)-\beta} e_n + \sum_{i=1}^{n-1} fr\left(\frac{q_i}{d}, kn^\gamma\right) e_i$$

where d, $q_i$, were selected as previously described.

Then v can be written in the following form:

$$v = (n-1)^{\xi(n-1)-\beta} e_n + \sum_{i=1}^{n-1} \left(\frac{b_i}{k}, \frac{t_i}{kn^\gamma}\right) e_i,$$

where $t_i$ is an integer and $0 \leq t_i < n^\gamma$. Moreover, the integers $t_i$ with the stated conditions are uniquely determined by the lattice L. Consequently, if n, $\beta$, $\xi$, $\gamma$, and $Q=Q_k(b_1, \ldots, b_{n-1})$ are fixed, then every possible value of the lattice L has a unique representation by at most n $\lceil \gamma \log_2 n \rceil$ bits.

Definition 4: As shown in lemma 1, if L is the random lattice defined previously, then L uniquely determines the sequence of integers $t_1, \ldots, t_{n-1}$ so that $0 \leq t_i < n^\gamma$ and $e_1, \ldots, e_{n-1}$, $$(n-1)^{\xi(n-1)-\beta} e_n + \sum_{i=1}^{n-1} \left(\frac{b_i}{k}, \frac{t_i}{kn^\gamma}\right) e_i$$

is a basis of L. Therefore a random value of L can be represented by the sequence $<b_1, \ldots, b_{n-1}, t_1, \ldots, t_{n-1}>$. Consequently, the definition of a random lattice L also provides a definition of the random sequences $b=<b_1, \ldots, b_{n-1}>$, $t=<t_1, \ldots, t_{n-1}>$. This is the definition used by system 10 to randomize b and t. In the other direction, if the integers $b_1, \ldots, b_{n-1}, b_i \in [0, k), t_1, \ldots, t_{n-1}, t_i \in [0, n^\gamma)$ are given then the corresponding lattice L is denoted by $$L(b_1, \ldots, b_{n-1}, t_1, \ldots, t_{n-1}, \xi, \beta, \gamma).$$

With the previously discussed notation, if ,$\beta$, $\xi$, and $\gamma$ are fixed, $b=<b_1, \ldots, b_{n-1}>$, $t=<t_1, \ldots, t_{n-1}>$ then L (b, t)= $L(b_1, \ldots, b_{n-1}, t_1, \ldots, t_{n-1}, \xi, \beta, \gamma)$.

The random sequences are defined as $b=<b_1, \ldots, b_{n-1}>$, $t=<t_1, \ldots, t_{n-1}>$. The sequence b is the information that is shared by all of the users and distributed together with the software implementing the system. The public key is the sequence t. Together with b and t, system 10 comprises a defined vector u in the lattice L=L (b, t), where u is the private key. As previously explained, in the knowledge of b and t it is easy to determine the basis $e_1, \ldots, e_{n-1}$, v of the lattice L (b, t). The dual is the basis $f_1, \ldots, f_n$ which is used for encryption. For the decryption, system 10 uses the vector u.

The constants $\beta>0$, $\xi>0$, $\gamma>0$ are chosen with the property $\gamma > \beta + \xi + 2$ and $$\beta > \xi + \frac{1}{2}.$$

This guarantees that u is indeed an $n^{-c}$-unique shortest nonzero vector in the lattice n, for a suitable constant c, and also that the security of system 10 can be reduced to the hardness assumption. For example, a good choice for the constants $\beta$, $\xi$, and $\gamma$ is $\beta=3$, $\xi=1$, and $\gamma=6$. The parameters $\xi$ and $\beta$ determine the value of c and c' in the hardness assumption, namely $c=\xi$ and $c'=\beta-\xi$. n is an integer that is required to be sufficiently large such that the computation problem described in the hardness assumption is already difficult for this particular value of n. Assume $\beta=3$, $\xi=1$, and $\gamma=6$. Taking into account the limitations of the known algorithms that find short vectors in lattices, n=1000 seems to be a reasonable choice.

The description of system 10 shows that the size of the public key is O(n log n). Indeed, the public key is the sequence of integers $t_1, \ldots, t_{n-1}$ where $0 \leq t_i < n^\gamma$ for i=1, ..., n. Therefore, if $t_1, \ldots, t_{n-1}$ are written in binary form then the total number of bits is at most $\gamma$ log n.

In system 10, each bit in the clear text is encrypted by O(n log n) bits. The length of the encrypted message (for a single bit) can be estimated in the following way. The encrypted message is a point of the parallelepiped $P=P(f_1, \ldots, f_n)$ whose components are approximated by a precision of $$\frac{1}{n}.$$

Therefore, the total number of bits in the encrypted message depends on the lengths of the vectors in P.

The construction of system 10 implies that each element of the basis B(b, t) is of polynomial length. This does not imply that the lengths of the vectors in the dual basis also have a polynomial upper bound. However, the special structure of the basis B(b, t) implies that there is a constant $\bar{c}$ such that for each i, if $f_i = <\phi_1^{(i)}, \ldots, \phi_n^{(i)}>$, then $|\phi_j^{(i)}| \leq n^{\bar{c}}$ for $j=1, \ldots, n-1$ and $|\phi_n^{(i)}| \leq n^{\overline{CR}}$. Consequently, if $y=<y_1, \ldots, y_n>$ is a point of P then for all $j=1, \ldots, n-1$, system 10 has $|y_j| \leq n^{\bar{c}+1}$ and $|y_n| \leq n^{\overline{cn}+1}$. Therefore, if $$\bar{y}_i = \frac{z_i}{n}$$

and $y_i$ is represented by the binary form of the integer $z_i$, then for each fixed $j=1, \ldots, n-1$, the number of bits used is at most $(\bar{c}+1)\lceil \log_2 n \rceil + 1$ bits, while for $j=n$ system 10 needs at most $(\bar{c}n+1)\lceil \log_2 n \rceil + 1$ bits. This implies that the vector $\bar{y}$ can be encoded with at most O(n log n) bits.

Figure 3:
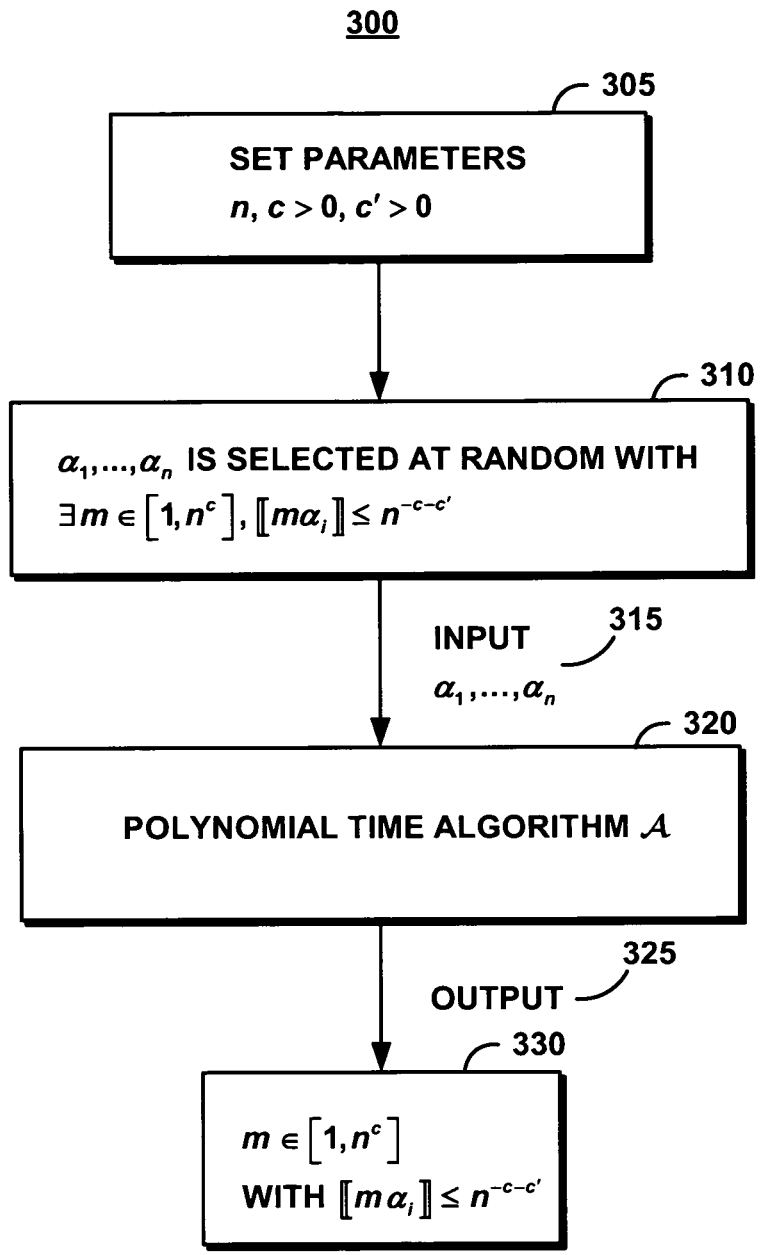
FIG. 3 is a process flow chart illustrating the Hardness Assumption and its applicability to the security of the system.

The diophantine approximation problem based on the following well-know theorem proved by Dirichlet in 1842 provides the hardness assumption of system 10, as illustrated by the method 300 of the process flow chart of FIG. 3.

Theorem A (Dirichlet): If $\alpha_1, \ldots, \alpha_n$ are real numbers in the interval (0, 1) and M>0 is an integer, then there is an integer $m \in [1, M^n]$ such that $$[[m\alpha_i]] \leq \frac{1}{M}$$

for all $i=1, \ldots, n$.

The proof does not provide an efficient way to find an integer m with the described property. Of interest are algorithmic questions related to this theorem; namely, the case when $M=n^{c_1}$ and a positive integer m exists so that for all $i=1, \ldots, n$, $[[m\alpha_i]] \leq n^{-c_2}M^{-1}$, where $c_1 > 0$, $C_2 > 0$ are constants and n is sufficiently large. Parameters are selected for system 10 (step 305). The hardness assumption of system 10 states that even if the numbers $\alpha_1, \ldots, \alpha_n$ are chosen at random (step 310) with the condition that there is such an m, there is still no efficient algorithm for finding the integer m.

Hardness assumption: For all c>0, C'>0, $C_1$>0, $C_2$>0, and for all probabilistic algorithms A the following holds: if n is sufficiently large and A provides an output in time $n^{C_1}$, then the probability that A solves problem Q1 formulated below is smaller than $n^{-c_2}$, where the probability is taken both for the random steps of A and the randomization in the formulation of the input.

Problem Q1: Assume that $\alpha_1, \ldots, \alpha_n$ are selected at random, independently, and with uniform distribution from the interval (0, 1) with the condition that there is an integer m so that:

$$1 \leq m \leq n^{cn} \text{ and } [[m\alpha_i]] \leq n^{-C-'} \text{ for } i=1, \ldots, n \quad (1)$$

Given n, $\alpha_1, \ldots, \alpha_n$, c, c' as input, find an integer m with property (1).

FIG. 3 illustrates the Hardness Assumption. The parameters n, c, c' are set at step 305. The input $\alpha_1, \ldots, \alpha_n$ is selected at step 310. The polynomial time algorithm A is looking for a solution at step 320, and the algorithm outputs the solution (step 325) that satisfies the requirement (step 330). The Hardness Assumption states that there is no polynomial time algorithm A which works in the way as shown in FIG. 3.

The assumption that problem Q1 is hard in the described sense seems reasonable, since in the last one and a half century, after Dirichlet formulated and proved theorem A, the problem of diophantine approximation was intensively studied in the framework that was created by this and similar theorems formulated by Dirichlet. To solve Problem Q1 by lattice algorithms, it is necessary to approximate a nonzero shortest vector by a polynomial factor. It is possible that the formulated average case problem is easier than the worst-case lattice problem for approximating a shortest nonzero vector by a polynomial factor. Still, the long history of diophantine approximation problems suggests that it is very unlikely that an efficient solution can be found for problem Q1.

It is to be understood that the specific embodiments of the invention that have been described are merely illustrative of certain applications of the principle of the present invention. Numerous modifications may be made to a public key cryptosystem and associated method utilizing a hard lattice with O(n log n) random bits for security described herein without departing from the spirit and scope of the present invention.

What is claimed is:

1. A method of generating public and private keys for a cryptosystem comprising:
   providing parameters, n, $\xi$, $\beta$ and $\gamma$ by the execution of a central processing unit, wherein n is an integer >3, $\xi$ is a real number >0, $\beta$ is a real number >0 and $\gamma$ is a real number >0;
   representing a lattice L using the parameters;
   generating an integer t representing the sequence $(t_0, \ldots, t_{n-1})$, as a public key for the cryptosystem wherein $0 \leq t_i < n^\gamma$, for $i=1, \ldots, n-1$;
   creating random values for the lattice L by selecting an integer d and a point q, such that:
   d=an integer selected at random in the interval $$\left[\frac{1}{2}(n-1)^{\xi(n-1)}, (n-1)^{\xi(n-1)}\right];$$

the point $q=<q_1, \ldots, q_{n-1}> \in$ set $I_{n-1}((n-1)^{-\beta}) \cap dQ$ selected at random, wherein $$Q = \prod_{i=1}^{n}\left[\frac{b_i}{k}, \frac{b_i+1}{k}\right);$$

wherein the lattice L has a basis with a sequence of vectors $e_1, \ldots, e_{n-1}, v$;
wherein $k=\lfloor(n-1)^{\xi(n-1)-1}\rfloor$ is a positive integer,
wherein v is a vector in the lattice L such that $$v = (n-1)^{-\xi(n-1)-\beta}e_n + \sum_{i=1}^{n-1} fr\left(\frac{q_i}{d}, kn^\gamma\right)e_i,$$

wherein $fr(qi/d, kn^\gamma) = b_i/k + t_i/kn^\gamma$,
wherein the integers $b_i$, $i=0,1, \ldots, n-1$ are in the interval [0,k]; and
generating a private key $u=dv-\Sigma_{i=1}^{n-1}a_ie_i$ for the cryptosystem,
wherein $a_1, \ldots, a_{n-1}$ are integers such that for $i=1, \ldots, n-1$, $$-\frac{1}{2} \leq e_i\left(dv - \sum_{i=1}^{n-1} a_ie_i\right) < \frac{1}{2}.$$

2. The method of claim 1, wherein the cryptosystem's security is based on a diophantine approximation problem of Dirichlet.

* * * * *